(12) United States Patent  (10) Patent No.: US 8,683,375 B2
Sano et al.  (45) Date of Patent: Mar. 25, 2014

(54) METHOD AND APPARATUS FOR A TABBED MESSAGING INTERFACE

(75) Inventors: Hitoshi Sano, Westford, MA (US); Sangita Shah, Kendall Park, NJ (US)

(73) Assignee: Nokia Corporation, Espoo (FI)

( * ) Notice: Subject to any disclaimer, the term of this patent is extended or adjusted under 35 U.S.C. 154(b) by 468 days.

(21) Appl. No.: 12/761,959

(22) Filed: Apr. 16, 2010

(65) Prior Publication Data

US 2011/0258541 A1  Oct. 20, 2011

(51) Int. Cl.
*G06F 3/048* (2013.01)
*G06F 15/16* (2006.01)
*G06F 3/01* (2006.01)

(52) U.S. Cl.
USPC ............................ 715/777; 715/702; 715/765

(58) Field of Classification Search
USPC ......................................... 715/702, 777, 765
See application file for complete search history.

(56) References Cited

U.S. PATENT DOCUMENTS 7,797,226 B2 * 9/2010 Ram et al. ........................ 705/37
2007/0186175 A1 * 8/2007 Hudson ........................... 715/764
2008/0229239 A1  9/2008 Elumalai et al.
2008/0261569 A1 * 10/2008 Britt et al. .................. 455/414.1
2010/0142401 A1 * 6/2010 Morris .......................... 370/254

OTHER PUBLICATIONS

About Pidgin, accessed on Nov. 16, 2010, http://www.pidgin.im/about/, pp. 1-3.
IM for Noki—Chat on the go, Nokia, accessed on: Nov. 30, 2010, http://store.ovi.com/content/20855, pp. 1-1.
mTalk—Multi-protocol Chat Client for Mobile Phones, Nov. 4, 2010, http://www.imessengr.net/2010/11/mtalk-multi-protocol-chat-client-for.html, pp. 1-2.
Sharing is Caring: 4 new social media features for the Nimbuzz blogs!, Aug. 28, 2009, http://blog.nimbuzz.com/category/features/, pp. 1-11.

* cited by examiner

*Primary Examiner* — Andrea Leggett
(74) *Attorney, Agent, or Firm* — Ditthavong Mori & Steiner, P.C.

(57) ABSTRACT

An approach is provided for improved messaging user interfaces. A subset of available messaging services is selected based, at least in part, on a touch control area of a user interface of a device. The user interface includes, at least in part, tabs corresponding to each of the available messaging services. Presentation of the user interface is caused, at least in part, at the device. The tabs presented in the user interface correspond to the subset.

20 Claims, 13 Drawing Sheets

METHOD AND APPARATUS FOR A TABBED MESSAGING INTERFACE

BACKGROUND

Service providers and device manufacturers (e.g., wireless, cellular, etc.) are continually challenged to deliver value and convenience to consumers by, for example, providing compelling network services. One area of interest has been the development of messaging related services (e.g., chat services, instant messaging services, etc.) which enjoy great popularity among users. This popularity has led to a proliferation of such services from a variety of service providers (e.g., Nokia®, Yahoo!®, Google®, AOL®, etc.). Moreover, it is noted that users often have multiple accounts across multiple service providers that can be used for different purposes (e.g., work, home, etc.) and with different groups (e.g., family, friends, etc.). Accordingly, service providers and device manufacturers face significant technical challenges to enabling users to efficiently and quickly access multiple messaging services and accounts on a common device. The technical challenges are particularly difficult when the user's device has limited input/output capabilities (e.g., a touch-enabled mobile device) and/or when the services are to remain separate and distinct.

SOME EXAMPLE EMBODIMENTS

Therefore, there is a need for an approach for improved messaging user interfaces.

According to one embodiment, a method comprises selecting a subset of available messaging services based, at least in part, on a touch control area of a user interface of a device. The user interface includes, at least in part, tabs corresponding to each of the available messaging services. The method also comprises causing, at least in part, presentation of the user interface at the device, wherein the tabs presented in the user interface correspond to the subset.

According to another embodiment, an apparatus comprising at least one processor, and at least one memory including computer program code, the at least one memory and the computer program code configured to, with the at least one processor, cause the apparatus to select a subset of available messaging services based, at least in part, on a touch control area of a user interface of a device. The user interface includes, at least in part, tabs corresponding to each of the available messaging services. The apparatus is also caused to cause, at least in part, presentation of the user interface at the device. The tabs presented in the user interface correspond to the subset.

According to another embodiment, a computer-readable storage medium carrying one or more sequences of one or more instructions which, when executed by one or more processors, cause, at least in part, an apparatus to select a subset of available messaging services based, at least in part, on a touch control area of a user interface of a device. The user interface includes, at least in part, tabs corresponding to each of the available messaging services. The apparatus is also caused to cause, at least in part, presentation of the user interface at the device. The tabs presented in the user interface correspond to the subset.

According to another embodiment, an apparatus comprises means for selecting a subset of available messaging services based, at least in part, on a touch control area of a user interface of a device. The user interface includes, at least in part, tabs corresponding to each of the available messaging services. The apparatus also comprises means for causing, at least in part, presentation of the user interface at the device. The tabs presented in the user interface correspond to the subset.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for presenting a touch enabled messaging user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
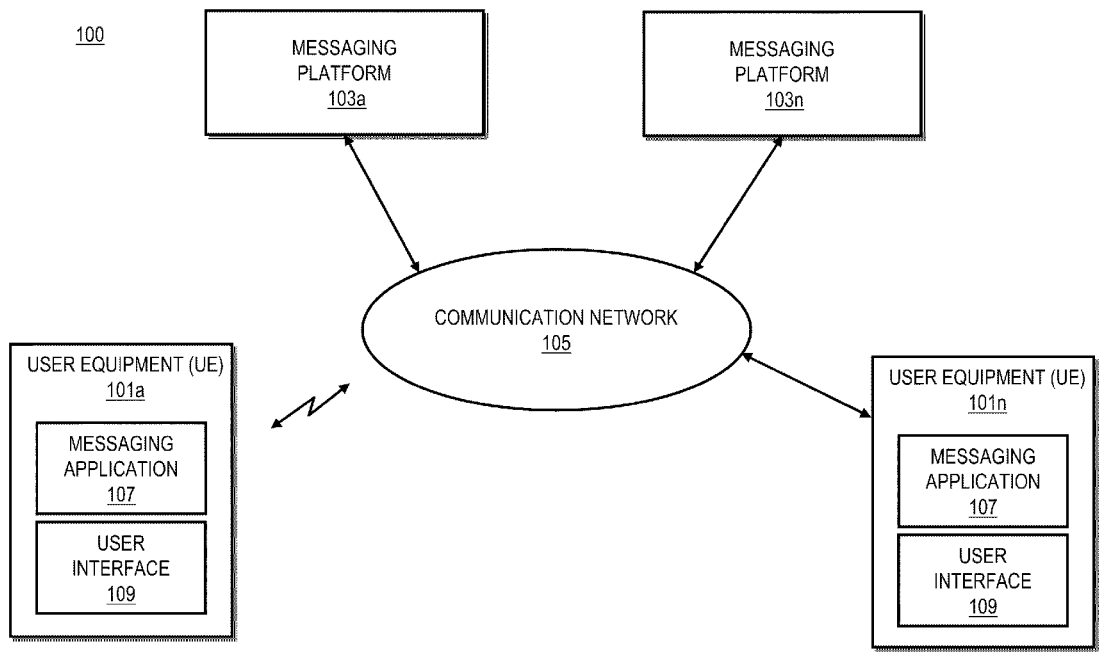
FIG. 1 is a diagram of a system capable of presenting a touch enabled messaging user interface, according to one embodiment.

FIG. 1 is a diagram of a system capable of presenting a touch enabled messaging user interface, according to one embodiment. In recent times, messaging services have become ubiquitous as users of devices increasingly seek the ability to contact and communicate with other users. A trend in these devices has been the increase in hardware capabilities, such as the manufacture and use of touch enabled hardware such as touch screen. Touch enabled hardware can enable a person to interact with what is displayed directly by touching the screen with the person's hand, finger, etc. rather than with an indirect input such as a mouse or touchpad. Different types of touch enabled hardware further include the use of an intermediate device such as a stylus. However, the use of an intermediate device is not required in touch enabled hardware. Examples of touch screen technology include resistive, surface acoustic wave, and capacitive touch screen technologies.

The use and availability of touch enabled hardware generates new and complex problems and technical difficulties in presenting services to users. One such service includes messaging services. In the past, different messaging services have been presented using different messaging applications. Some messaging applications allow for the presentation of multiple messaging capabilities, however, these messaging applications do not take into account technical difficulties of presenting various messaging services via touch enabled hardware. In cases where the devices are mobile devices and/or include a screen with a limited viewing area, small text and icons are utilized to allow for a greater amount of content. However, these approaches to present a large amount of messaging information in a limited screen do not account for technical parameters associated with touch enabled devices. For example, it is technically difficult to accurately pinpoint what a user wishes to select if an area for selection is small.

To address this problem, a system 100 of FIG. 1 introduces the capability to present a touch enabled messaging user interface, according to one embodiment. User equipment (UEs) 101a-101n can communicate with other UEs 101 and messaging platforms 103a-103n via a communication network 105. Messages can travel from one UE 101a to another UE 101n via a peer-to-peer connection or via one of the messaging platforms 103. A messaging application 107 on the UE 101 can be utilized to send and receive the messages. Further, a user interface 109 of the UE 101 may present messages and other information associated with the messaging application 107 and receives input. The UE 101 may include touch enabled hardware that allows interaction via the user interface 109. Moreover, the messaging application 107 can be associated with one or more messaging services. Many users of messaging services today use more than one different type of messaging service. For example, a user may use a Nokia Ovi Messaging™, an AOL Instant Messenger™, Yahoo Instant Messenger™, Google Talk™, Windows Live Messenger™, etc. Further, the user may associate one or more of the different types of messenger services to different types of friends or colleagues. For example, the user may use a first messaging service when communicating with a group of college friends and a second messaging service for communicating with work colleagues.

With the various types of messaging services, various types of network and communication services and hardware may be utilized. As such, the various messaging services may include one or more different networking layouts and/or schemes. In one example, these layouts may include one or more gateways and/or servers between the messaging platform 103 the UEs 101. These gateways may be included as part of the communication network 105 and may be utilized for protocol adaptation and/or translation and/or network traffic related data collection and/or billing.

Because users utilize multiple different types of services, it would be advantageous for the messaging application 107 to present messages associated with each type of service. This can be accomplished via displaying tabs of the various messaging services via the user interface 109. In certain embodiments, a messaging service is available on the UE 101 if the messaging application 107 is configured to be able to use the messaging service. For example, the messaging service is available if a user name and/or password for the messaging service is available to the messaging application 107 and/or the messaging application 107 selects these messaging services to be active. A user may select which messaging services are active using a user interface (e.g., the user interface of FIG. 5).

Further, when executing, the messaging application 107 can select a subset of the available messaging services based on a touch control area of the user interface 109. The user interface 109 can include tabs corresponding to each of the available messaging services. Moreover, the touch control area of the user interface 109 as well as a layout may be used to determine the number of tabs to be presented to the user at a time. For example, the layout may include tabs presented across the screen as shown in FIGS. 7A-7E. Additionally or alternatively, the layout can include a number of tabs to be presented based on a portion of the user interface 109. The selected subset of the available messaging services can be presented on the user interface 109. Further, the tabs in the user interface 109 can correspond to the subset.

Moreover, the messaging application 107 can cause, at least in part, presentation of one or more navigation controls in the touch control area. Examples of navigation controls include one or more arrows or scrolling interfaces. The messaging application 107 can further receive, via the user interface 109, input selecting the navigation controls. The selection of the navigation controls can then cause selection of another subset of the available messaging services based on the input. This selection of the other subset can be caused to be presented in place of the subset.

In certain scenarios, each of the available messaging services are logged into by the user. A message associated with one of the available messaging services can be received via the communication network 105. The message can be detected by the messaging application 107. The messaging application 107 then determines which messaging service is associated with the message. Then, the messaging application 107 presents a visual indicator associated with the messaging service on the user interface 109. The visual indicator can include a change in color or highlighting of one of the tabs or the navigation controls. In one embodiment, as shown in FIG. 7C, the message is associated with a service corresponding to a presented tab. This tab may be highlighted or marked with a particular color. In certain embodiments, a distinctive color such as red, yellow, orange, another color that can be noticeable (e.g., due to contrast with other colors presented on the user interface 109), etc. may be used to bring attention to the tab. In another embodiment, as shown in FIG. 7D, the message is associated with a messaging service corresponding to a non-presented tab. As such, the visual indicator is a navigational control (e.g., an arrow) leading to the messaging service.

In certain scenarios, the user may select the visual indicator. The selection may include a touch enabled input. As such, the presentation of visual indicator may include enough pixel area to be selected. With this approach, an area associated with the visual indicator can be sized to enable receipt of the touch enabled input to select the visual indicator. The sizing can be based on sizes of fingers and/or include a buffer area for determining the center of a selection. When the visual indicator is selected, the user interface 109 may present a predefined area that is defined to present a messaging interface associated with the service and received message. As such, the message can be presented. Further, the highlighting or coloring of the visual indicator can be presented persistently until the user interface 109 presents the predefined area.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UEs 101, messaging platforms 103, and other devices communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the messaging platform 103 may interact according to a client-server model with the messaging application 107. According to the client-server model, a client process sends a message including a request to a server process, and the server process responds by providing a service (e.g., messaging services). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
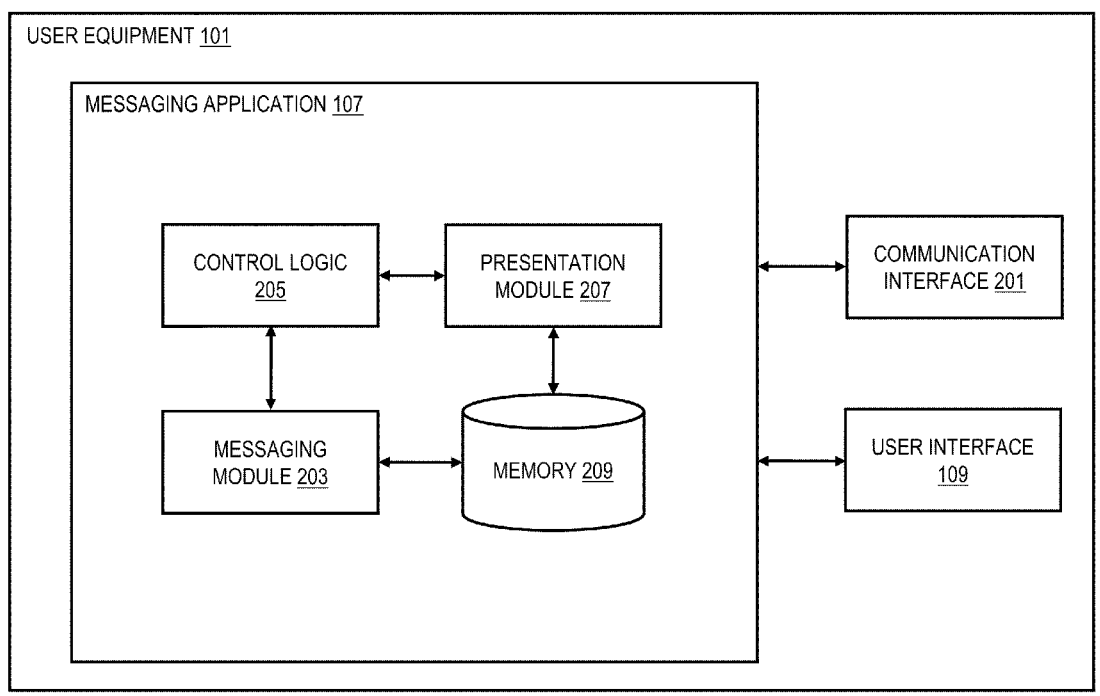
FIG. 2 is a diagram of the components of user equipment, according to one embodiment.

FIG. 2 is a diagram of the components of user equipment, according to one embodiment. By way of example, the UE 101 includes one or more components for causing presentation of a touch enabled messaging interface. It is contemplated that the functions of these components may be combined in one or more components or performed by other components of equivalent functionality. In this embodiment, the UE 101 includes a communication interface 201, a user interface 109, and a messaging application 107 that includes a messaging module 203, control logic 205, a presentation module 207, and memory 209.

In one embodiment, the communication interface 201 can be used to communicate with a messaging platform 103 or other UEs 101. Certain communications can be via methods such as an internet protocol, cellular messaging (e.g., SMS, MMS, etc.), or any other communication method (e.g., via the communication network 105). In some examples, the UE 101 can send a message to another UE 101 via the communication interface 201. The message can be sent first to the messaging platform 103 or directly to the UE 101. In certain embodiments, the messaging platform 103 is utilized to track the location of UEs 101 (e.g., via a login) to provide the communication interface 201 with a means to directly communicate with users of other UEs 101.

The user interface 109 can include various methods of communication. For example, the user interface 109 can have outputs including a visual component (e.g., a screen), an audio component, a physical component (e.g., vibrations), and other methods of communication. User inputs can include a touch-screen interface, a scroll-and-click interface, a button interface, a microphone, combinations thereof, etc. Moreover, the user interface 109 may be used to display messages as well as messaging interfaces. Exemplary messaging interfaces are shown in FIGS. 7A-7E. The user interface 109 may further include various types of input for navigating messages and generating messages. The input can be via one or more methods such as voice input, textual input, typed input, typed touch-screen input, other touch-enabled input, etc.

The control logic 205 can use the messaging module 203 to control the communication interface 201 and the presentation module 207 to determine presentations via the user interface 109. The messaging module 203 can further control multiple different types of available messaging services. In certain embodiments, a messaging service is available if the messaging service is active or available for use and/or can receive messages. When a message is received via the communication interface 201, the messaging module 203 determines which messaging service is associated with the message. Further, the message may be stored in memory 209. Then, the messaging module 203 causes presentation, via the presentation module 207, of a visual indicator of the message. As previously noted, the visual indicator can include a change in color of a tab or navigation control, etc. When the visual indicator is activated (e.g., via a touch enabled input), a presentation of the message and/or the messaging service associated with the message can be caused on the user interface 109.

Figure 3:
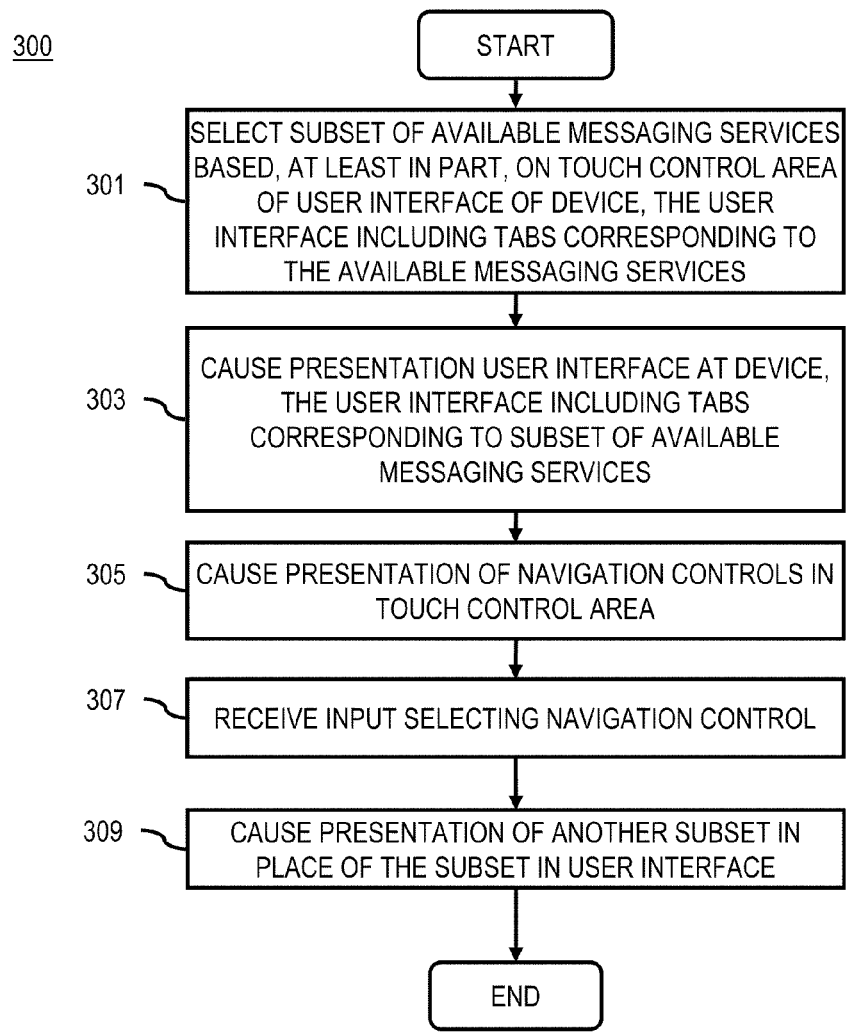
FIG. 3 is a flowchart of a process for presenting a touch enabled messaging user interface, according to one embodiment.

FIG. 3 is a flowchart of a process for presenting a touch enabled messaging user interface, according to one embodiment. In one embodiment, the messaging application 107 performs the process 300 and is implemented in, for instance, a chip set including a processor and a memory as shown FIG. 9. As such, the messaging application 107, its components, and/or other components of the UE 101 can provide means for accomplishing various parts of the process 300 as well as means for accomplishing other processes.

In step 301, the messaging application 107 selects a subset of available messaging services based, at least in part, on a touch control area of a user interface 109 of the UE 101. The user interface 109 can include, at least in part, tabs corresponding to each of the available messaging services as further detailed in FIGS. 7A-7E. The tabs can be sized based on the available touch control area, exemplary tab specifications are presented in FIG. 6. The available touch control area can be determined by a size of a screen of the UE 101. The size can be determined based on the number of pixels for the screen and/or based on physical dimensions. The touch control area can be defined based on the total screen dimensions or based on an available size allotted for the presentation of tabs associated with various messaging interfaces.

Further, as noted above, a messaging service can be considered available if the messaging service is configured to be able to receive and send messages. The messaging services can be configured to be accessible using various methods and interfaces, such as the interface of FIG. 5. The subset of messaging services can include one or more messaging services to be presented on the user interface 109. The selection of the subset may additionally be based on one or more criteria. For example, the subset may be selected and/or sorted based on alphabetical order, a selection made by the user, an ordering associated with time and/or importance factor, etc. A time and/or importance factor may include a setting set by the user indicating that a particular messaging service associated with employment is to be more prominently displayed on work days during work hours. Another example of a time and/or importance factor can include a setting based on most commonly or recently used messaging services.

Then, at step 303, the messaging application 107 causes, at least in part, presentation of the user interface 109 at the UE 101. The tabs presented on the user interface can correspond to the subset. The number of tabs to be presented can be dependent on the screen dimensions and/or the dimensions of an area associated with the presentation of the tabs. This area may additionally be selected by a developer of the messaging application 107 and/or the user.

The messaging application 107 further can cause, at least in part, presentation of one or more navigation controls in the touch control area (step 305). The touch control area associated with the navigation controls may be associated with the presentation of the tabs or be in relation to one or more areas of the screen with a touch enabled interface. When a user wishes to navigate to other messaging services, the user can enter input via the touch enabled interface. The messaging application 107 receives the input for selecting one of the navigation controls (step 307). Based on the input, the messaging application 107 selects another subset of the available messaging services. In one example, the tabs associated with the messaging services can be presented in a sorted fashion (e.g., alphabetical order). Because only a subset of the messaging services are presented at a given time, the user can utilize navigation controls (e.g., arrows, scrolling bars, etc.) to view other tabs. Selecting one of the tabs can additionally cause presentation of a messaging interface associated with the messaging service corresponding to the selected tab. Based on the input, the messaging application 107 thus causes presentation of another subset in place of the subset in the user interface 109 (step 309).

In one example, three tabs are presented associated with a first messaging service, a second messaging service, and a third messaging service. A messaging interface associated with the second messaging service is presented. When an arrow is selected to scroll in a particular direction, a different subset of tabs including the second messaging service, the third messaging service, and a fourth messaging service is presented. Further selection options regarding navigation controls are detailed in the user interfaces of FIGS. 7A-7E.

Figure 4:
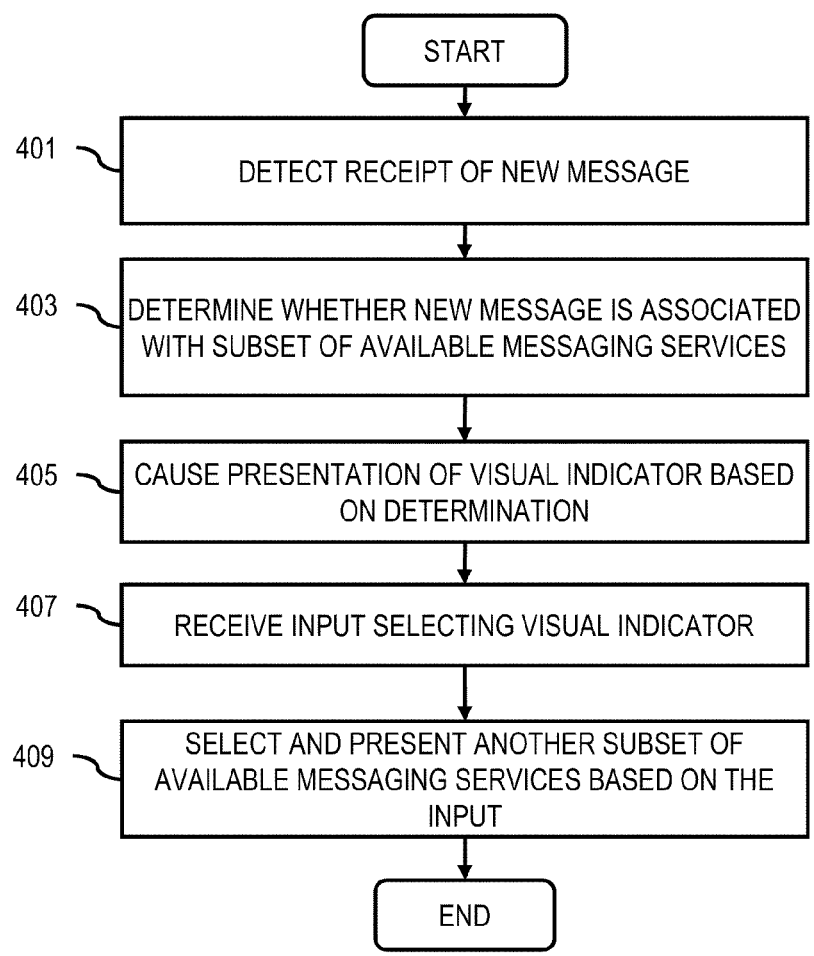
FIG. 4 is a flowchart of a process for interacting with a touch enabled messaging user interface, according to one embodiment.

FIG. 4 is a flowchart of a process for interacting with a touch enabled messaging user interface, according to one embodiment. In one embodiment, the messaging application 107 performs the process 400 and is implemented in, for instance, a chip set including a processor and a memory as shown FIG. 9. As such, the messaging application 107, its components, and/or other components of the UE 101 can provide means for accomplishing various parts of the process 400 as well as means for accomplishing other processes.

The messaging application 107 can be executing on the UE 101 of a user. Presentation of a user interface 109 associated with the messaging application 107 is caused. As noted above, the presentation can include one or more tabs associated with one or more available messaging services. Then, at step 401, the messaging application 107 detects receipt of a new message associated with one of the messaging services. The messaging application 107 then determines whether the new message is associated with a subset of the available messaging services whose tab is being presented (step 403). Then, at step 405, the messaging application 107 causes presentation of a visual indicator based on the determination. Examples of a visual indicator can include a pop up, a change in color or highlight of a tab, a change in color or highlight of a navigation control, etc.

In one embodiment, it is determined that the new message is associated with an available messaging service included in one of the tabs presented. The visual indicator may include causing, at least in part, highlighting and/or coloring of the tab corresponding to the available messaging service associated with the tab. In another embodiment, it is determined that the new message is not associated with one of the available messaging services in the subset presented. In this embodiment, the visual indicator may include an arrow or other navigation user interface element navigating to the available messaging service associated with the new message. In certain scenarios, a presented arrow may change colors or highlights based on a received message. The visual indicator can be sized and placed on the user interface 109 in a manner such that the user can select the visual indicator (e.g., the navigation user interface element or colored/highlighted tab).

Then, at step 407, the messaging application 107 receives input selecting the visual indicator. The input may be a touch enabled input selecting the visual indicator by touching the presented visual indicator.

Next, at step 409, the messaging application 107 selects and presents another subset of the available messaging services based on the input. In one embodiment, the input is used to select a tab associated with the received message. The tab is then brought into focus. As such, a presentation of a predefined area that is defined to present a messaging interface associated with the available messaging service corresponding to the tab. Further, the tab may additionally be brought into focus. For example, in the case of having three tabs presented, the tab in focus may continuously be the tab in the left, middle, or right. The other tabs may change corresponding to a sorting of the tabs as well. Examples of a predefined area associated with the messaging interface include a grouping of chats between the user and another user associated with the new message, a list of contacts associated with the one available messaging service, etc. In another embodiment, the input is used to select a navigation control, such as an arrow or scroll bar. In response, the messaging application 107 can cause, at least in part, presentation of a tab corresponding to the one available messaging service and presentation of a predefined area that is defined to present a messaging interface of the one available messaging service. The tab can correspond to an available messaging service not in the original selected subset. Further, a new subset can be formed and presented with the one available messaging service as the focal point.

Figure 5:
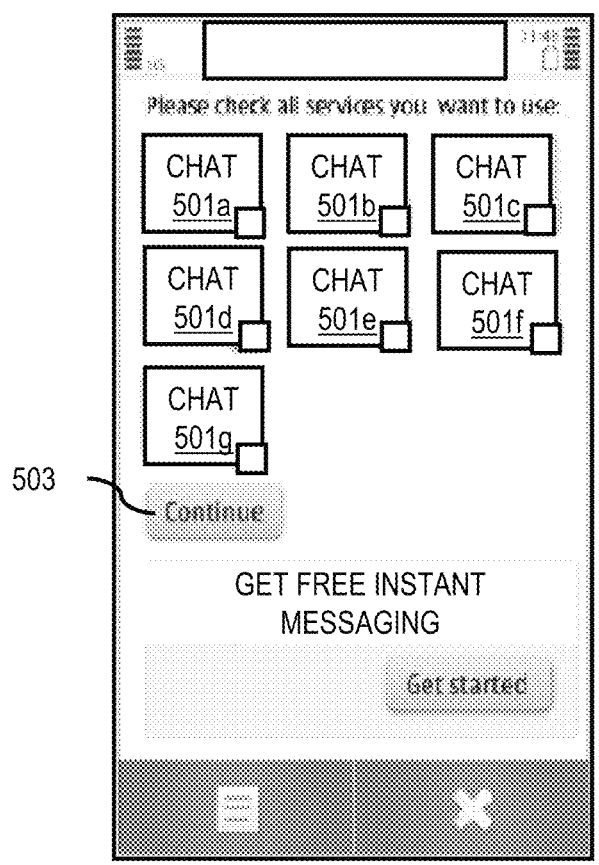
FIG. 5 is a diagram of a touch enabled user interface associated with a messaging application, according to various embodiments.

FIG. 5 is a diagram of a touch enabled user interface associated with a messaging application, according to various embodiments. The user interface 500 displays options selecting one or more chat messaging services 501a-501g. When the user selects the messaging services, the user may select a continuation button 503 to enter account information associated with each service. In certain embodiments, account information can be saved in a memory associated with the messaging application 107. Further, if the user does not have an account for one or more of the services, the user can be prompted to register for an account. One or more accounts can be registered for each messaging service 501. Each of the messaging services and/or messaging accounts may have a separate tab that can be used in presentation and interaction of messaging services.

Figure 6:
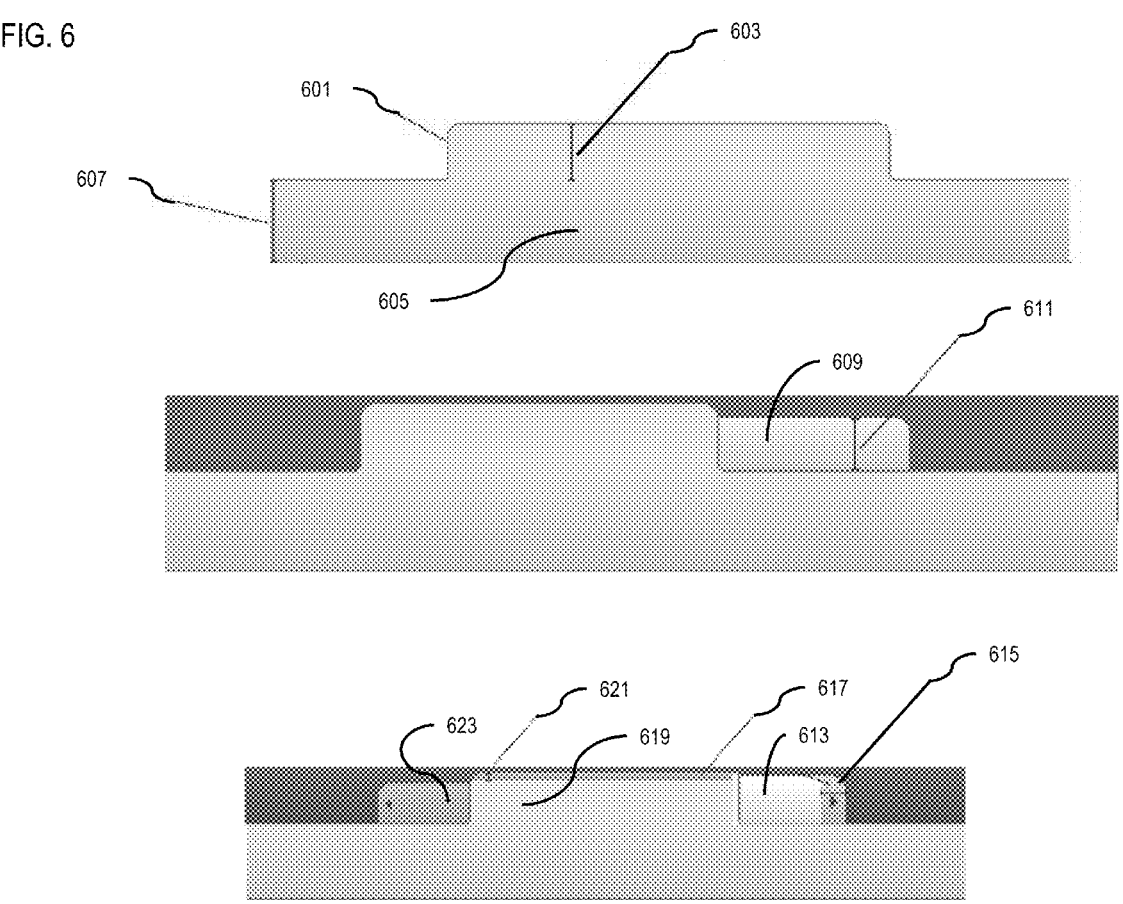
FIG. 6 is a diagram of tabs used in a touch enabled messaging user interface, according to one embodiment.

FIG. 6 is a diagram of tabs used in a touch enabled messaging user interface, according to one embodiment. As noted, the tabs can be used to separate different messaging brands available and/or different accounts available for those brands. The number of tabs available for presentation can be based on the number of services selected by the user. The tabs may include an active tab 601 with a particular height 603. The height may be determined in pixels or physical dimensions. Exemplary heights for an active tab 601 may include 30-50 pixels. For example, the height 603 may be 39 pixels. This may correspond to an advantageous touching input based on the size of the screen. Further a status bar 605 may be presented in association with the active tab 601. The status bar 605 may include additional information about the status of the user of the UE 101 in relation to messaging. The status bar 605 may additionally be formulated to have a height 607. In certain embodiments, the height 607 of the status bar 605 may be greater than the height 603 of the tab. Further, an inactive tab 609 may be presented on the side of the active tab 601. The inactive tab 609 can have a height 611 that is different than the height 603 of the active tab 601. For example, the height 611 of the inactive tab 609 can be less than the height of the active tab 603 (e.g., 20-40 pixels corresponding to the size of the active tab 601). Further, additional inactive tabs can be presented.

Additional navigation controls may additionally be presented in association with the tabs. For example, another inactive tab 613 may be adjacent to a navigation control user interface element 615. This navigational control user interface element 615 can include an arrow or other indicator of navigation associated with selection of the navigational control user interface element 615. Further, when a new message is received for a messaging service not represented in the presented tabs, the navigational control user interface element 615 can be highlighted (e.g., colored) to indicate that a new message is awaiting viewing. Moreover, another visual indicator 617 of the new message can be a highlighting or otherwise making more prominent an extension of the current active tab 619 in focus. The highlighted visual indicator 617 may be a difference in height 621 between the current active tab 619 and inactive tabs 613, 623.

Figure 7A:
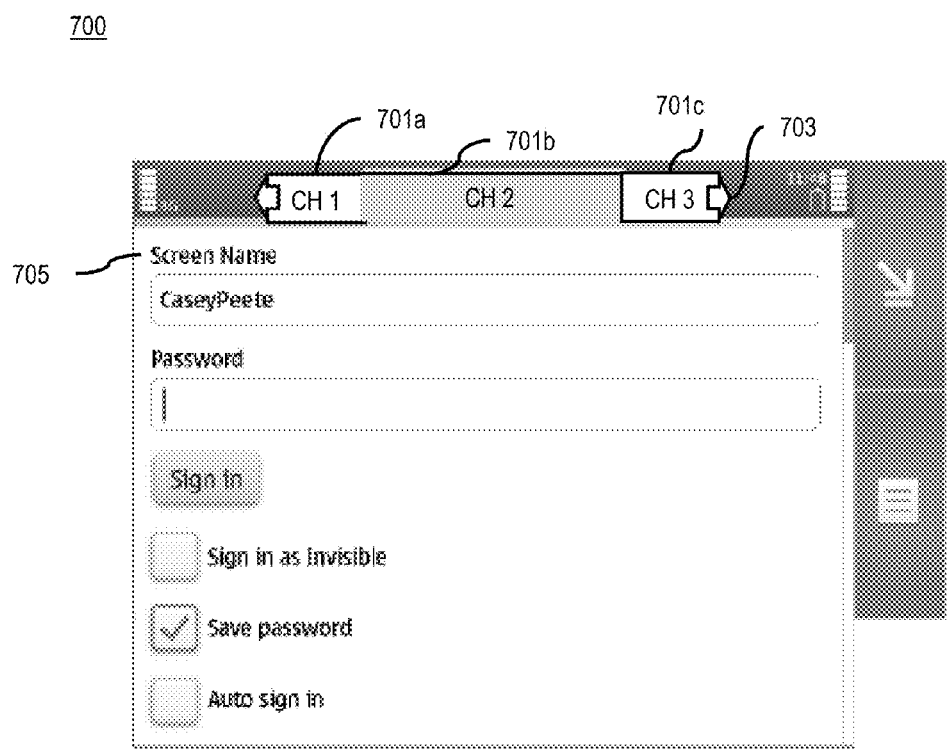
FIGS. 7A-7E are diagrams of user interfaces utilized in the processes of FIGS. 3 and 4, according to various embodiments.
Figure 7B:
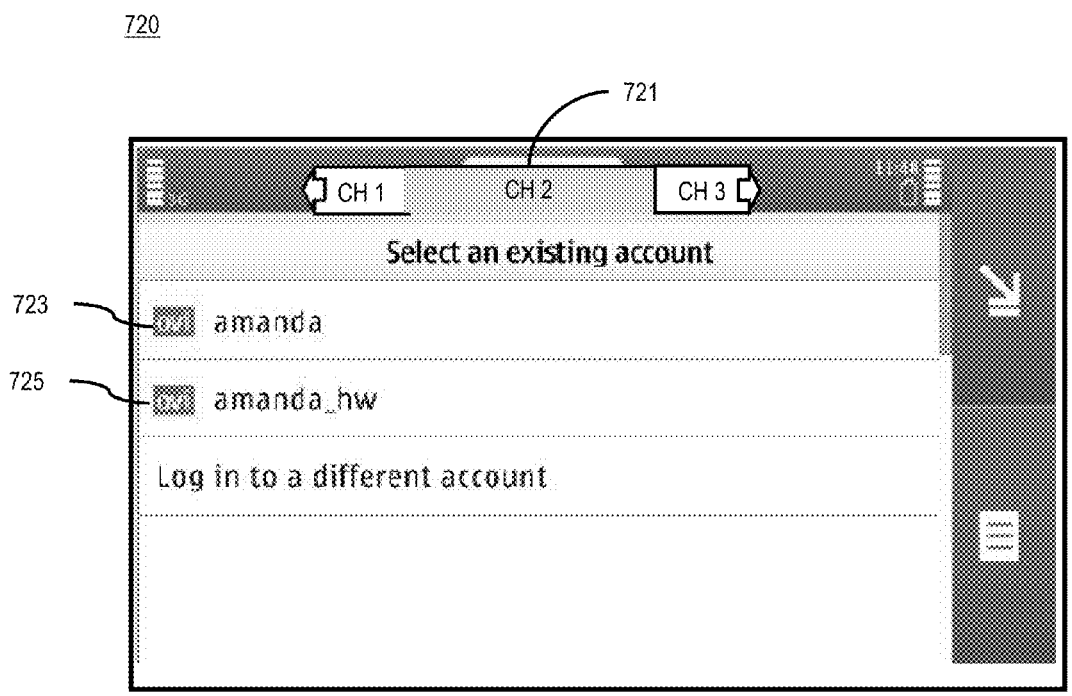
Figure 7C:
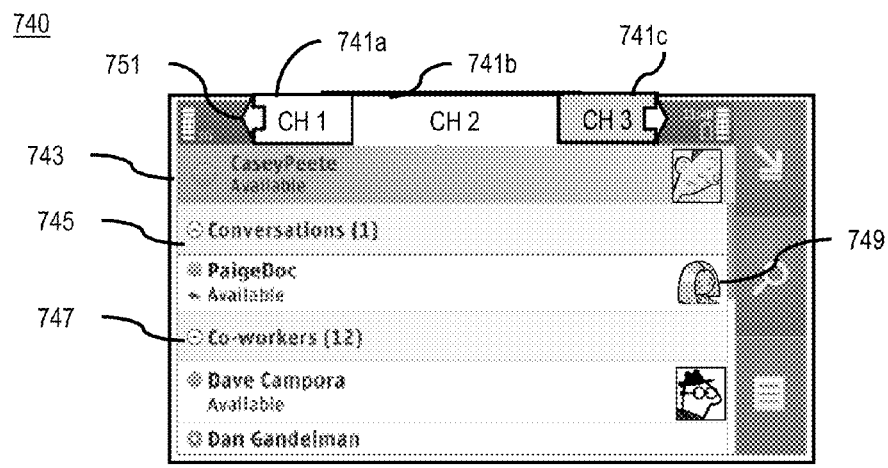
Figure 7D:
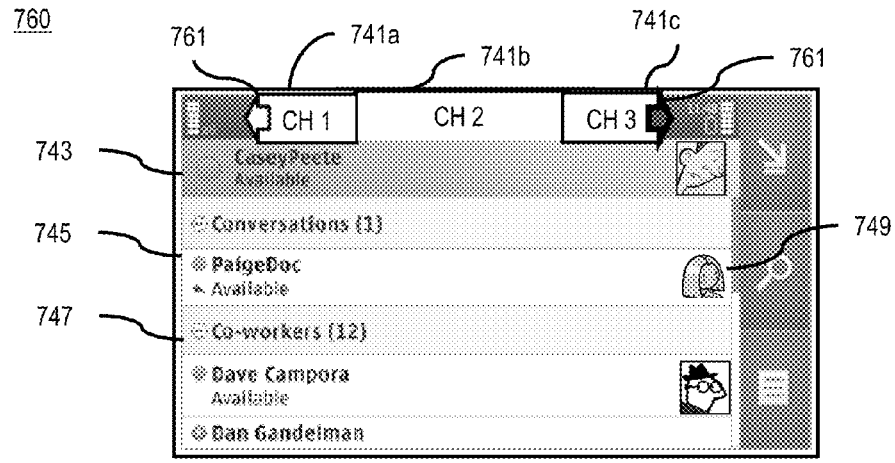

FIGS. 7A-7E are diagrams of user interfaces utilized in the processes of FIGS. 3 and 4, according to various embodiments. FIG. 7A shows a user interface 700 including tabs 701a-701c corresponding to messaging services. The tabs 701 of messaging services can be selected as a subset of a larger group of messaging services available on the UE 101. In this example, the second chat messaging service tab 701b is in focus showing a predefined messaging login interface. Additionally one or more navigation control user interface elements 703 can be presented in addition to the tabs. These user interface elements 703 can be of a size where a touch screen input can be determined based on a touch of the user. Further, the user is provided the option to sign into the active messaging service using a screen name 705 and password. The user may enter this information and additionally save the login credentials on the UE 101. Further, the user may logout of one or more of the services. When the user logs out, the service may be deactivated, but available as an option to sign into.

FIG. 7B displays a presentation of user interface 720 presenting logon options for a particular messaging service 721. The logon options allow the user to sign onto one or more existing accounts 723, 725 associated with the messaging service. One or more of the accounts may be associated with different groups of contacts. Further, additional accounts may additionally be logged onto. In one embodiment, the user may select both accounts to log onto. Each account may be presented in a single tab 721 associated with the messaging service or as separate tabs tied both to the messaging service and the accounts.

FIGS. 7C and 7D show presentations of user interfaces 740, 760 while actively using messaging service accounts. A set of messaging service accounts are represented via tabs 741 a-741c. One of the service tabs 741b is in focus and logged into the corresponding messaging service. An account status 743 can be presented to the user. The account status 743 may include such features as presence information associated with the user, the user account name, avatar images, etc. Further, the focused messaging interface can further include listings of contacts. These contacts can be presented via one or more groupings. For example, a group may exist for current conversations 745, co-workers 747, friends, buddies, college friends, etc. These groups may be customized by the user or predetermined categories. Further, the groups may be dynamic. For example, the current conversations 745 group can include contacts that have active conversations with the user. The contact can be removed from the list when a conversation is closed. Certain contacts may include an image 749 associated with the contact. The image can be an avatar of the user or any other image associated with the user.

The user interface 740 can additionally include one or more navigation controls 751. The navigation controls may include an arrow feature. When the arrow is pressed, another available service associated with a messaging application 107 can be presented. For example, if there are five available messaging services on the UE 101, selecting the navigation control 751 may be used to scroll through the available messaging services. Further, the navigation control 751 can be sized and positioned such that selecting the navigation control 751 can be distinct from selecting one of the tabs 741.

When a new message associated with one of the messaging services arrives at the messaging application 107, the messaging application 107 determines which of the available messaging services is associated with the received message. In the scenario of user interface 740, the message is determined to be associated with tab 741c. The tab 741c is then modified to be more prominent. Exemplary modifications include shading, highlighting, coloring, changing the size, etc. of the tab 741c. In this scenario, the tab 741c is highlighted to indicate the existence of at least one new message associated with the tab 741c. A user may select the tab 741c using a touch enabled interface to show a presentation of a messaging interface associated with the tab 741c.

In the scenario of user interface 760, the message is determined to be associated with an available and active messaging service not represented by a tab 741. In this scenario, one of the navigation controls 761 is made more prominent via highlighting or coloring. When the user selects the navigation control 761, navigation can commence to the new message. In other scenarios, selection of the navigation control 761 causes presentation of the next tab in that direction. If the next tab is associated with a new message, the tab can be highlighted. If the next tab is not associated with a new message or another new message is available on another service, the navigation control 761 remains highlighted. The navigation control 761 can thus be persistently highlighted until the new message is presented to the user. In one embodiment, the one of the navigation controls 761 may be selected for presentation over another navigation control 761 based on the how close the navigation control is to selecting the messaging service associated with the new message. For example, navigation control 761 may be selected if less clicks of the navigation control 761 are needed to reach the messaging service than another messaging control 763. In certain embodiments, when more than one navigation control have the same number of clicks associated, a default option can be selected for highlighting.

Figure 7E:
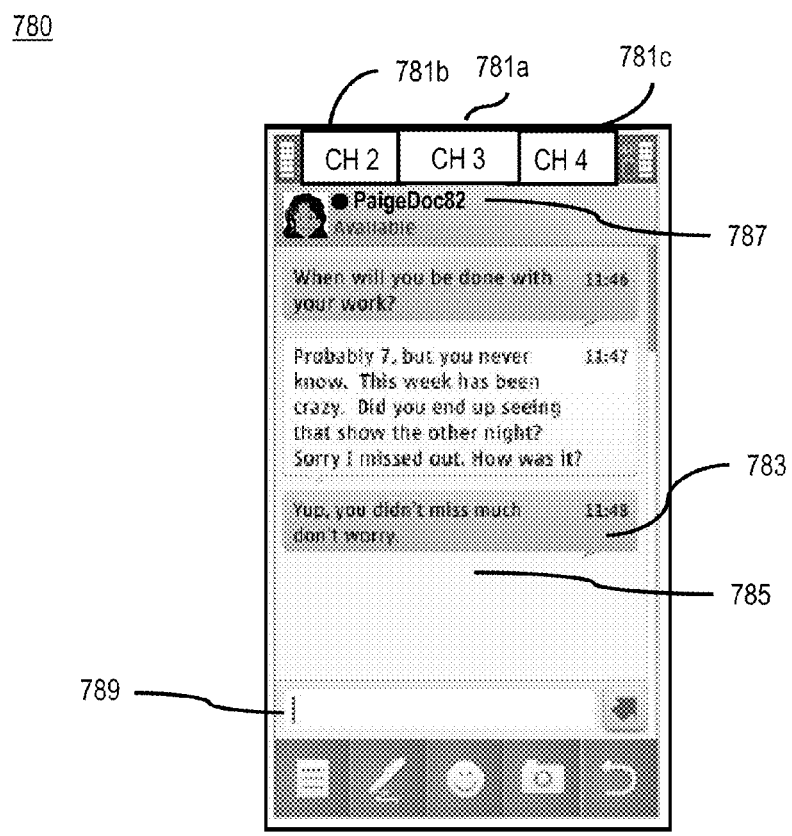

FIG. 7E shows a diagram of a user interface associated with messaging with a user. In this user interface 780, the user is communicating on a different tab 781a from FIG. 7C. This tab may correspond to tab 741c of FIG. 7C after the user selects the tab for presentation. Highlighting of the tab can be removed because the new message 783 is presented. The new message 783 is then presented to the user. The messaging interface 785 may further include a status 787 of the contact the user is communicating with as well as one or more fields 789 for inputting text, images, or other information to send to the contact. As noted previously, the available inputs may include a touch screen interface allowing the user to directly interact with the images presented on the screen.

With the above approaches, a presentation of messaging information can be presented via a touch enabled interface. The improved interface can use tabs to present information. In a UE 101 with a limited screen size, the amount of information that can be quickly presented is important. Thus, the use of tabs and presentation of highlighting of user interface elements (e.g., tabs, arrows, etc.) that are multifunctional are useful. Further, with improvements and widespread use of touch enabled technology, sizing and placement of tabs, arrows, and other user interface elements can additionally be used to quickly present messaging information to a user. With the use of touch enabled technology, the size of user interface elements is important because the user interface elements would need to encompass at least a minimum size to that a user's touch on the user interface element can be monitored. As such, improvements of sizing and/or placement of such user interface elements are advantageous.

The processes described herein for presenting an improved touch enabled messaging user interface may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
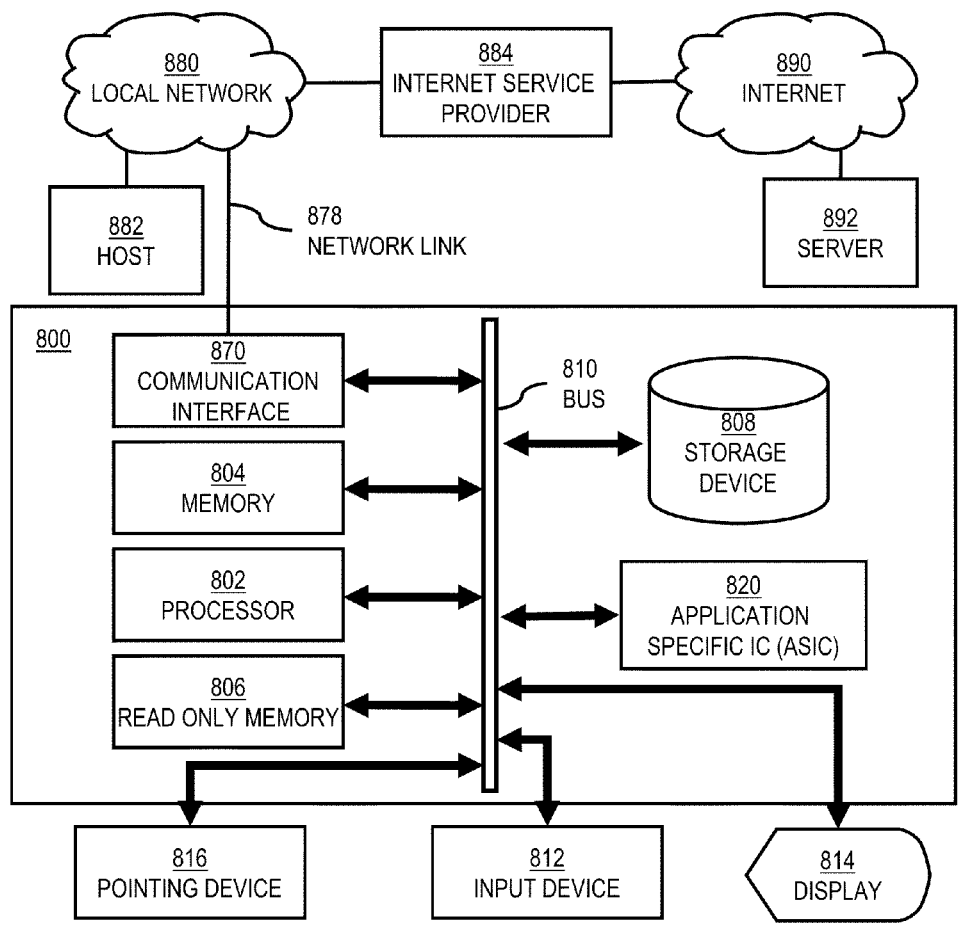
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to present an improved touch enabled messaging user interface as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of presenting an improved touch enabled messaging user interface.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to present an improved touch enabled messaging user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for presenting an improved touch enabled messaging user interface. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for presenting an improved touch enabled messaging user interface, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
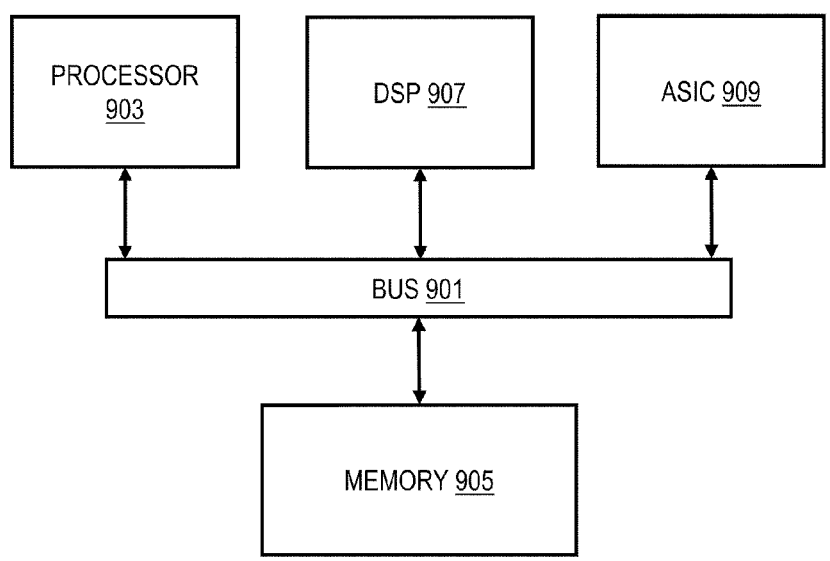
FIG. 9 is a diagram of a chip set that can be used to implement an embodiment of the invention.

FIG. 9 illustrates a chip set or chip 900 upon which an embodiment of the invention may be implemented. Chip set 900 is programmed to determine and present an improved touch enabled messaging user interface as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of services. Chip set or chip 900, or a portion thereof, constitutes a means for performing one or more steps of causing presentation of an improved touch enabled messaging user interface.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to present an improved touch enabled messaging user interface. The memory 905 also stores the data associated with or generated by the execution of the inventive steps.

Figure 10:
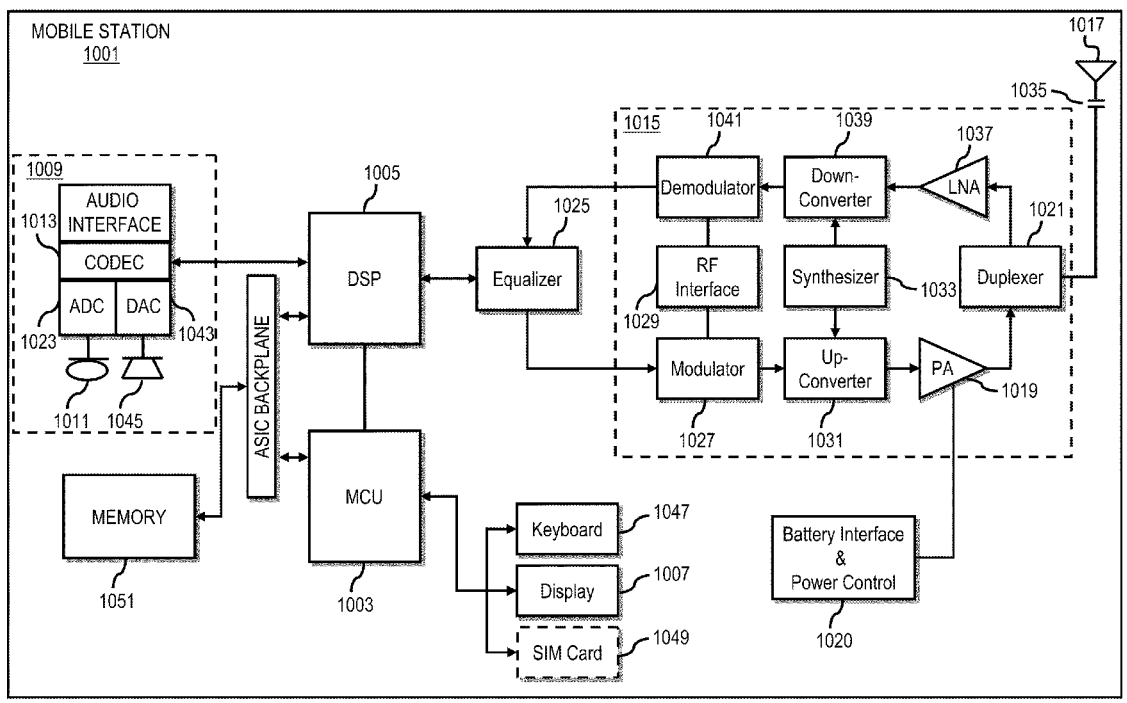
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of presenting an improved touch enabled messaging user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of presenting an improved touch enabled messaging user interface. The display 10 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to present an improved touch enabled messaging user interface. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   causing, at least in part, selection of a subset of available messaging services based, at least in part, on a touch control area of a user interface of a device; and
   causing, at least in part, presentation of a plurality of tabs on the user interface based, at least in part, on the selection of the subset, wherein the tabs are associated with a plurality of brands and the subset.

2. A method of claim 1, further comprising:
   causing, at least in part, presentation of one or more navigation controls in the touch control area;
   causing, at least in part, selection of another subset of the available messaging services based, at least in part, on an input for selecting one of the navigation controls; and
   causing, at least in part, presentation of another plurality of tabs associated with the another subset in place of the tabs in the user interface.

3. A method of claim 1, further comprising:
   detecting receipt of a new message associated with one of the available messaging services in the subset; and
   causing, at least in part, highlighting of the tab associated with the one available messaging service based, at least in part, on the detection.

4. A method of claim 3, wherein the highlighting includes, at least in part, a change in color of the associated tab, the method further comprising:
   receiving a touch enabled input selecting the corresponding tab; and
   causing, at least in part, presentation of a predefined area that is defined to present a messaging interface associated with the one available messaging service.

5. A method of claim 4, wherein the change in color is persistent until the predefined area is caused to be presented.

6. A method of claim 1, further comprising:
   detecting receipt of a new message that is not associated with one of the available messaging services in the subset; and
   causing, at least in part, presentation of a visual indicator of the new message in the user interface based, at least in part, on the detection.

7. A method of claim 6, wherein the visual indicator is an arrow for navigating to the one available messaging service, the method further comprising:
   receiving a touch enabled input selecting the arrow; and
   causing, at least in part, presentation of a tab corresponding to the one available messaging service and presentation of a predefined area that is defined to present a messaging interface associated with the one available messaging service.

8. A method of claim 1, wherein the presentation of the tabs includes, at least in part, a messaging interface associated with one of the available messaging services in the subset and one of the brands, and the tabs are rendered on one or more sides of the messaging interface.

9. A method of claim 1, wherein the brands are associated with a plurality of service providers.

10. A method of claim 1, wherein the tabs are presented in the touch control area of the user interface.

11. An apparatus comprising:
    at least one processor; and
    at least one memory including computer program code for one or more programs,
    the at least one memory and the computer program code configured to, with the at least one processor, cause the apparatus to perform at least the following,
    cause, at least in part, selection of a subset of available messaging services based, at least in part, on a touch control area of a user interface of a device; and
    cause, at least in part, presentation of a plurality of tabs on the user interface based, at least in part, on the selection of the subset, wherein the tabs are associated with a plurality of brands and the subset.

12. An apparatus of claim 11, wherein the apparatus is further caused to:
    cause, at least in part, presentation of one or more navigation controls in the touch control area;
    cause, at least in part, selection of another subset of the available messaging services based, at least in part, on an input for selecting one of the navigation controls; and
    cause, at least in part, presentation of another plurality of tabs associated with the another subset in place of the tabs in the user interface.

13. An apparatus of claim 11, wherein the apparatus is further caused to:
    detect receipt of a new message associated with one of the available messaging services in the subset; and
    cause, at least in part, highlighting of the tab associated with the one available messaging service based, at least in part, on the detection.

14. An apparatus of claim 13, wherein the highlighting includes, at least in part, a change in color of the associated tab, and wherein the apparatus is further caused to:

receive a touch enabled input selecting the corresponding tab; and cause, at least in part, presentation of a predefined area that is defined to present a messaging interface associated with the one available messaging service.

15. An apparatus of claim 11, wherein the apparatus is further caused to:

detect receipt of a new message that is not associated with one of the available messaging services in the subset; and cause, at least in part, presentation of a visual indicator of the new message in the user interface based, at least in part, on the detection.

16. An apparatus of claim 15, wherein the visual indicator is an arrow for navigating to the one available messaging service, and wherein the apparatus is further caused to:

receiving a touch enabled input selecting the arrow;

causing, at least in part, presentation of a tab corresponding to the one available messaging service and presentation of a predefined area that is defined to present a messaging interface associated with the one available messaging service.

17. A computer-readable storage medium carrying one or more sequences of one or more instructions which, when executed by one or more processors, cause an apparatus to at least perform the following steps:

causing, at least in part, selection of a subset of available messaging services based, at least in part, on a touch control area of a user interface of a device; and causing, at least in part, presentation of a plurality of tabs on the user interface based, at least in part, on the selection of the subset, wherein the tabs are associated with a plurality of brands and the subset.

18. A computer-readable storage medium of claim 17, wherein the apparatus is caused to further perform:

causing, at least in part, presentation of one or more navigation controls in the touch control area;

causing, at least in part, selection of another subset of the available messaging services based, at least in part, on an input for selecting one of the navigation controls; and causing, at least in part, presentation of another plurality of tabs associated with the another subset in place of the tabs in the user interface.

19. A computer-readable storage medium of claim 17, wherein the apparatus is caused to further perform:

detecting receipt of a new message associated with one of the available messaging services in the subset; and causing, at least in part, highlighting of the tab associated with the one available messaging service based, at least in part, on the detection.

20. A computer-readable storage medium of claim 19, the highlighting includes, at least in part, a change in color of the associated tab, and wherein the apparatus is caused to further perform:

receiving a touch enabled input selecting the corresponding tab; and causing, at least in part, presentation of a predefined area that is defined to present a messaging interface associated with the one available messaging service.

\* \* \* \* \*